United States Patent
Park et al.

(10) Patent No.: US 8,483,730 B2
(45) Date of Patent: Jul. 9, 2013

(54) METHOD AND SYSTEM FOR MANAGING CHANNEL SET FOR DYNAMIC CHANNEL ALLOCATION

(75) Inventors: Changhyun Park, Seoul (KR); Myung-Sun Song, Daejeon (KR); Sang-Won Kim, Daejeon (KR); Sunmin Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 519 days.

(21) Appl. No.: 12/676,598

(22) PCT Filed: Sep. 4, 2008

(86) PCT No.: PCT/KR2008/005202
§ 371 (c)(1),
(2), (4) Date: May 25, 2010

(87) PCT Pub. No.: WO2009/031825
PCT Pub. Date: Mar. 12, 2009

(65) Prior Publication Data
US 2010/0240407 A1    Sep. 23, 2010

(30) Foreign Application Priority Data
Sep. 5, 2007 (KR) .......... 10-2007-0090060
Dec. 14, 2007 (KR) .......... 10-2007-0131028

(51) Int. Cl.
*H04B 15/00* (2006.01)
*H04B 7/00* (2006.01)
*H04W 72/00* (2009.01)

(52) U.S. Cl.
USPC ......... 455/501; 455/509; 455/513; 455/452.1

(58) Field of Classification Search
CPC .................................................... H04W 24/00
USPC ....... 455/450, 451, 452.1, 512, 513
See application file for complete search history.

(56) References Cited

U.S. PATENT DOCUMENTS 5,343,513 A * 8/1994 Kay et al. .......... 455/452.1
5,422,932 A * 6/1995 Kay et al. .......... 455/452.1
(Continued)

FOREIGN PATENT DOCUMENTS

JP    2002-082669    3/2002
JP    2005-151301 A    6/2005
(Continued)

OTHER PUBLICATIONS

Thilakawardana D, et al., "A Genetic Approach to Cell-by-Cell Dynamic Spectrum Allocation for Optimising Spectral Efficiency in Wireless Mobile Systems," CrownCom 2007, Orlando, Florida, US, Aug. 1-3, 2007.

(Continued)

Primary Examiner — Tilahun B Gesesse
(74) Attorney, Agent, or Firm — Rabin & Berdo, P.C.

(57) ABSTRACT

A method for managing a channel set for dynamic channel allocation, and a system for performing the method. The method includes predicting a channel state and a channel quality on a vacant channel based on channel information that is obtained by spectrum sensing and communication protocol. The predicting includes modeling an occupation pattern of the vacant channel to calculate a probability in which an incumbent user (IU) licensed to use the vacant channel appears on the vacant channel. The method also includes evaluating reliability on the prediction result, and giving a priority to the vacant channel based on the evaluated reliability.

17 Claims, 5 Drawing Sheets

U.S. PATENT DOCUMENTS

| | | | |
|---|---|---|---|
| 6,347,224 B1 * | 2/2002 | Smyth et al. | 455/406 |
| 7,590,389 B2 * | 9/2009 | Anderson | 455/67.7 |
| 2005/0195909 A1 | 9/2005 | Hwang et al. | |
| 2009/0305713 A1 * | 12/2009 | Yamazaki et al. | 455/450 |

FOREIGN PATENT DOCUMENTS

| | | |
|---|---|---|
| JP | 4268327 | 2/2009 |
| KR | 1999-0002838 | 1/1999 |
| KR | 2007-0051675 | 5/2007 |
| WO | WO-/2007/055551 | 5/2007 |

OTHER PUBLICATIONS

V. Blaschke, et al., "Occupation measurements supporting dynamic spectrum allocation for cognitive radio design," In Proceedings of CROWNCOM, Orlando, USA, Aug. 2007.

* cited by examiner

METHOD AND SYSTEM FOR MANAGING CHANNEL SET FOR DYNAMIC CHANNEL ALLOCATION

TECHNICAL FIELD

The present invention relates to a method for managing a channel set in a wireless communication system, and more particularly, to a method for setting an appropriate priority to vacant channel usage by regularly managing the vacant channels in a cognitive radio (CR) communication system for dynamically allocating frequencies or channels.

The present invention is supported by the IT Research and Development program of the Ministry of Information and Communication and the Institute of Information Technology Advancement (IITA), Republic of Korea [2005-S-002-03, Development of Cognitive Radio Technology For Efficient Spectrum Utilization].

This application claims the benefit of Korean Patent Application No. 10-2007-0131028, filed on Dec. 14, 2007 and 10-2007-0090060, filed on Sep. 5, 2007, in the Korean Intellectual Property Office, the disclosures of which incorporated herein in its entirety by reference.

BACKGROUND ART

Cognitive radio communication systems are systems which improve the efficiency of spectrum usage of TV channel bands by using vacant channels which are not used by a licensed user. In this case, in order to improve the efficiency of vacant channel usage, channels should be managed intelligently.

In order to intelligently manage channels, functions for channel management should be defined, and the configuration of functional blocks and a procedure thereof should be clearly presented.

Spectrum management is directed to channel allocation and resource allocation, which are necessary to efficiently use frequencies. In a conventional technology, analysis on channel occupation and information characterizing traffic density is used for channel allocation and resource allocation.

DISCLOSURE OF INVENTION

Technical Problem

In order to improve the efficiency of vacant channel usage, channels should be managed intelligently.

Technical Solution

The present invention provides a method for managing a spectrum of a cognitive radio communication system, using which the range of information necessary for channel selection to be moved in a system for dynamically allocating channels, such as a cognitive radio system etc., and a method for applying the information are provided so that a corresponding system can select optimum moving channels.

Advantageous Effects

According to the present invention, necessary information for determining an appropriate frequency to be moved for a system which dynamically changes frequencies is obtained by spectrum sensing and the result of communication protocol and is provided such that a corresponding system can select an optimum moving channel.

In addition, according to the present invention, a channel state and quality are predicted, and a weighted value is given to the predicted channel state and quality according to the reliability of the prediction value to determine the priority of an available channel, thereby allocating channels such that more reliable channel selection is possible.

In addition, according to the present invention, a CR communication system for dynamically allocating frequencies or channels manages vacant channels regularly so as to set an appropriate priority to usage of the vacant channels such that a channel set can be managed efficiently.

The present invention can be used as a core element in all of the fields requiring channel or frequency change.

DESCRIPTION OF DRAWINGS

The above and other features and advantages of the present invention will become more apparent by describing in detail exemplary embodiments thereof with reference to the attached drawings in which.

BEST NODE

Figure 1:
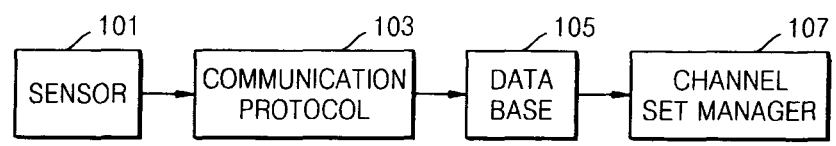
FIG. 1 schematically illustrates information flow in a communication system for managing a channel set according to an embodiment of the present invention.

According to an aspect of the present invention, there is provided a system for managing a channel set for dynamic channel allocation, the system including: a channel predictor predicting a channel state and a channel quality on a vacant channel based on channel information that is obtained by spectrum sensing and communication protocol; a reliability determining unit evaluating reliability on the prediction result; and a channel set manager giving a priority to the vacant channel based on the evaluated reliability.

According to another aspect of the present invention, there is provided a method for managing a channel set for dynamic channel allocation, the method including: predicting a channel state and a channel quality on a vacant channel based on channel information that is obtained by spectrum sensing and communication protocol; evaluating reliability on the prediction result; and giving a priority to the vacant channel based on the evaluated reliability.

According to another aspect of the present invention, there is provided a computer readable recording medium in which a program for executing the method for managing a channel set for dynamic channel allocation is recorded.

Mode for Invention

The present invention will be described more fully hereinafter with reference to the accompanying drawings in which exemplary embodiments of the invention are shown. It should be noted that like elements in the drawings denote like reference numerals although the elements are illustrated in different drawings. In describing the invention as below, when it is deemed that a detailed description of a related well-known function or structure may make the key point of the invention unnecessarily vague, the detailed description will be omitted.

In addition, when a certain portion 'includes' a certain element, it means that other elements are not excluded but the portion may further include other elements unless there is a specifically opposed description.

The present invention relates to a method for managing a channel set, so as to allocate an optimum channel used in a wireless communication system, in particular, in a cognitive radio (CR) communication system, to a user. The present invention focuses on a method for intelligently managing channels.

The present invention includes the concept of managing a channel set based on information obtained by the results of spectrum sensing and communication protocol discussion. A database (DB) as a storage device in the present invention means all devices for storing information, and a channel set does not mean a specific channel set but means the range of all possible channel sets that can be classified.

In the present invention, types of parameters used to manage a channel set include (1) estimated values of a channel quality, (2) estimated values of a next state of channel occupation, (3) estimated values of a holding time of a channel vacancy state based on statistical values regarding the interest of channels and past records of usage times, and (4) the probability of occurrence of an incumbent user who is licensed for usage of a particular channel.

The present invention further includes the concept for giving weighted values to information necessary for channel set management. The present invention (1) can give weighted values on the presented parameters by using reliability evaluation of each estimated value, (2) can use estimated values of the state of channel occupation by replacing it with the probability of occurrence of the incumbent user, (3) can increase weighted values of estimated values of a channel quality according to the cause for channel change and can further increase weighted values of estimated values related to a channel vacancy state and a channel occupation state, and (4) can increase weighted values as a vacancy holding time comes closer to the current time when estimated values of the vacancy holding time are calculated.

The channel set may comprise an active set, a candidate set, an occupied set, and a null set etc. The active set is a set of channels currently being used in a cognitive radio (CR) system or a licensed system or by a licensed user (an incumbent user such as TV in broadcasting frequency or wireless microphone and the like). The candidate set is a set of vacant channels that can be used as the active set. The occupied set is a set of channels that are currently occupied (used) by a licensed user. The null set is a set of channels that do not belong to any one of the above-mentioned sets, and when the state of channels of a candidate set is deficient, the candidate set may belong to the null set.

The present invention focuses on updating of the active set, the candidate set, and the null set. In other words, when a channel situation changes, channels that belong to the null set may be reclassified into the candidate set, and channels that belong to the candidate set may be reclassified into the null set or the active set. Thus, such management must be continuously performed so that a CR system can select channels to be changed fast and efficiently.

In order to perform such channel management, a reference on channel classification must be determined, and channel sets must be classified according to the reference; the present invention proposes parameters to be used as the reference regarding channel classification.

FIG. 1 schematically illustrates information flow in a communication system for managing a channel set according to an embodiment of the present invention. Referring to FIG. 1, information for channel set management according to the present invention comprises information that is obtained by sensing the channels and information that is obtained in a communication protocol procedure, and each kind of information is formed as a database (DB) 105 and is used by a channel set manager.

Channel set management starts with a spectrum sensing. A sensor 101 performs sensing of each channel, obtains information on whether or not the occurrence of a licensed user (an incumbent user) is detected at a corresponding channel and information on the types of licensed users, and transmits the obtained information to the DB 105. The sensor 101 may be embedded in a system for managing a channel set that will be described later, or may be installed separately.

The DB 105 records details of the channels such as the occupation state of channels according to a time, such as a sensing time, whether or not channels are occupied, and the types of channel occupation systems and the like and stores them. In addition, the DB 105 receives channel quality information (for example, Signal to Interference plus Noise Ratio (SINR) information) that is obtained when information obtained from the sensor 101 is transmitted by a communication protocol 103, matches the received channel quality information with data to be used in further channel quality evaluation, such as time, channels, and SINR etc., and stores them.

A channel set manager 107 gives a priority to each channel based on a channel quality and a channel state of each of channels predicted by information accumulated on the DB 105, thereby managing a channel set.

Figure 2:
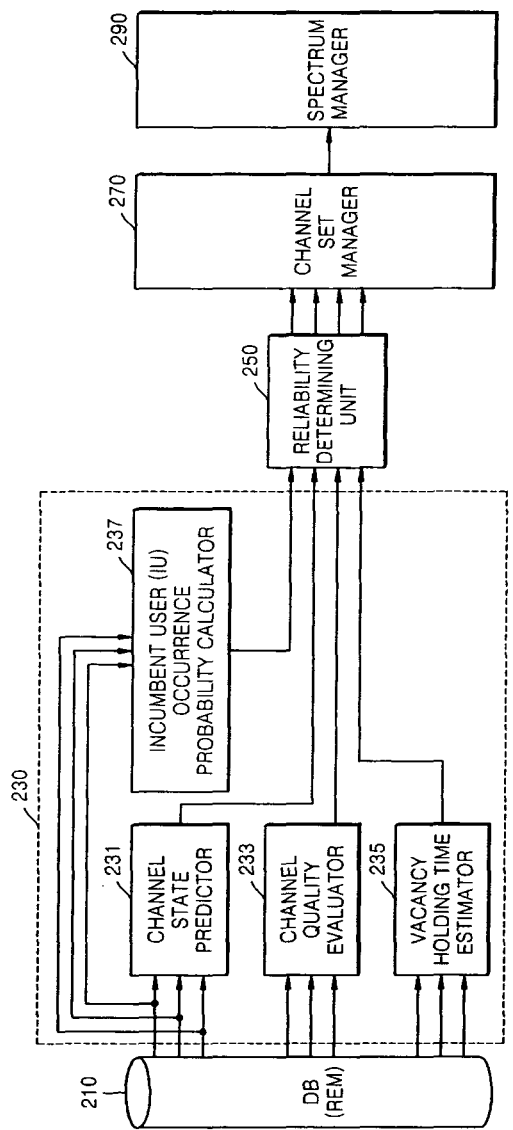
FIG. 2 is a schematic block diagram of the structure of a system for managing a channel set according to an embodiment of the present invention.

FIG. 2 is a schematic block diagram of the structure of a system for managing a channel set according to an embodiment of the present invention. Referring to FIG. 2, the system for managing a channel set according to the present embodiment of the present invention comprises a DB 210, a channel predictor 230, a reliability determining unit 250, a channel set manager 270, and a spectrum manager 290.

The DB 210 is a storage device storing channel information that is obtained by spectrum sensing and a communication protocol on respective channels. The DB 210 may retain the channel information that is obtained by spectrum sensing and the communication protocol according to time and channels. The DB 210 may be a radio environment map (REM) in a CR system, for example. REM provides current and past radio environment information and supports a CR function for characterizing channel usage patterns, for performing spectrum sensing based on existing knowledge and for supporting a network. REM may include a geographical information DB, a policy and regulation DB, a service DB, past-performed recording DB, and a radio transmission/reception DB etc.

The channel predictor 230 includes a channel state predictor 231, a channel quality evaluator 233, a vacancy holding time estimator 235, and an incumbent user (IU) occurrence probability calculator 237.

The channel state predictor 231 receives information that is obtained by spectrum sensing, such as sensing time, channels, an occupation state, and the types of occupation systems etc., from the DB 210. The channel state predictor 231 models channel occupation patterns of each channel based on the input information. The channel state predictor 231 calculates whether or not the next state of each channel is empty by modeling, or whether or not the probability of the occurrence of a licensed user is high and provides the probability value to the channel set manager 270.

The channel quality evaluator 233 evaluates the channel quality by using a past recording of each channel that is currently examined. In order to evaluate the channel quality, enough information to evaluate the channel quality must be included in the DB 210. Basically, it is useful for information for channel quality evaluation at the same time and location to be included in the DB 210. When it is determined that channel quality evaluation is not performed by using sufficient information, a low weighted value may be provided to channel quality evaluation information by the channel set manager 270.

The vacancy holding time estimator 235 estimates a vacancy holding time of each channel based on statistical values regarding the duration from a specific time to be estimated to a channel occupation starting time in each past time period.

Figure 3:
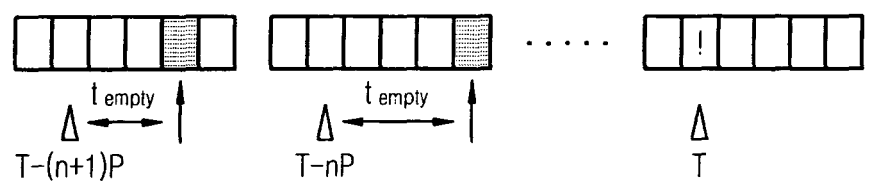
FIG. 3 illustrates the operation of estimating a vacancy holding time according to an embodiment of the present invention.

FIG. 3 illustrates the operation of estimating a vacancy holding time according to an embodiment of the present invention. The concept of the method can be expressed by using equation 1, $$\sum^{N} \frac{1}{\text{Passed\_period \#}} \cdot \frac{t_{empty}}{|\text{period} - T|} \quad (1)$$

where T is a specific time to be estimated, period (P) is one period, and Passed_period is a passed period, and N is a total period number.

It is determined how long a corresponding channel is empty from time T during one period of the past. However, the probability of a channel always being empty for the same duration is low. Thus, in the present invention, an empty time $t_{empty}$ from time corresponding to the specific time T within a past time period, such as time T−P prior to one period than the specific time, time T−2P prior to two periods than the specific time, ..., and time T−nP prior to n periods than the specific time, to the channel occupation starting time is calculated, and a vacancy holding time of each channel is calculated by using the statistic value of the empty time. In this case, (Passed_period #)$_{-1}$ is a portion for giving a higher weighted value to a period that is closer to the current time, and to multiply by $t_{empty}$ is to perform normalization.

The incumbent user (IU) occurrence probability calculator 237 calculates and provides the probability how frequently a licensed user appears prior to the current time (the specific time to be estimated). The IU occurrence probability calculator 237 is a portion for calculating the probability very simply, and the result of the channel state predictor 231 includes the probability. Thus, in general, the IU occurrence probability calculator 237 does not have a large weighted value, or may not be used. The IU occurrence probability calculator 237 may be replaced and used to calculate an IU occurrence probability when reliability is evaluated to be low on the result of the channel state predictor 231. An IU occurrence probability $P_f$ at a specific time may be calculated by [IU occurrence frequency/overall time length].

Calculation of the channel state predictor 231, the channel quality evaluator 233, the vacancy holding time estimator 235, and the IU occurrence probability calculator 237 may be performed independently.

The reliability determining unit 250 evaluates reliability regarding the prediction result that is output from the channel state predictor 231, the channel quality evaluator 233, the vacancy holding time estimator 235, and the IU occurrence probability calculator 237, which are constituting parts of the channel predictor 230. The reliability determining unit 250 may be constituted independently, as illustrated in FIG. 2, or as one element of the channel predictor 230 or the channel set manager 270. The reliability determining unit 250 may be designed to evaluate reliability only regarding the prediction result of the channel state predictor 231. For example, when Hidden Markov Model is used for channel state prediction, the algorithm can determine the reliability of the prediction result using Log Likelihood value.

The channel set manager 270 has the function of synthesizing information on the prediction result output by the channel predictor 230 and aligning the synthesized information according to priorities. The channel set manager 270 determines the weighted value of each prediction result by referring to reliability information that is obtained by the reliability determining unit 250 and the amount of information of the channel quality DB when the information is synthesized. The channel set manager 270 may determine a weighted value according to the importance of each prediction result. In addition, the channel set manager 270 may give a relatively high weighted value to the result of predicting a channel quality or a channel state according to the cause for channel change, may calculate a score regarding each channel based on the weighted values, and may give a priority according to the calculated score. The channel set manager 270 may use the prediction result of the IU occurrence probability calculator 237 instead of the prediction result of the channel state predictor 231, when reliability on the prediction result of the channel state predictor 231 is low. The channel set manager 270 updates a channel set when a channel having the highest priority is allocated to a user who wants to change channels.

The spectrum manger 290 selects a channel having the highest priority among from the list of a vacant channel set to which a priority is given by the channel set manager 270, thereby allocating the channel having the highest priority to the user who wants to change channels.

Figure 4:
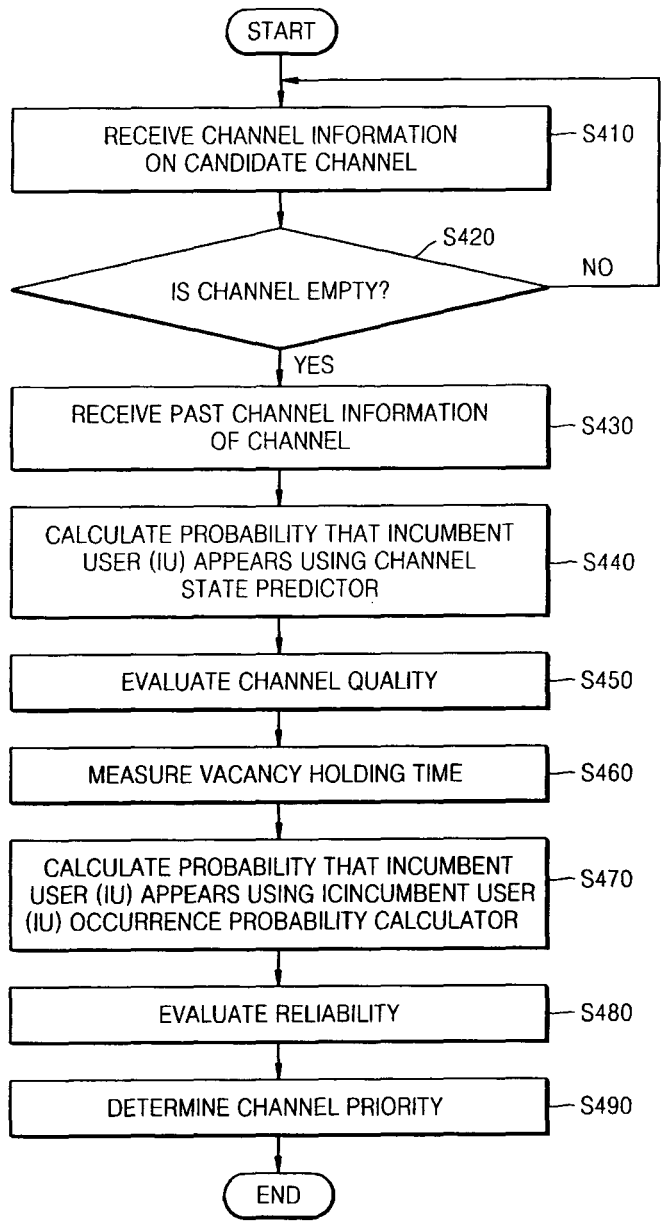
FIG. 4 is a flowchart illustrating a method for managing a channel set for dynamic channel allocation according to an embodiment of the present invention.

FIG. 4 is a flowchart illustrating a method for managing a channel set for dynamic channel allocation according to an embodiment of the present invention. A detailed description of the detail repeated with the description of the system for managing a channel set will be omitted.

Referring to FIG. 4, the method for managing a channel set according to the present embodiment of the present invention comprises: predicting a channel quality and a channel state of a vacant channel based on channel information that is obtained by spectrum sensing and communication protocol; evaluating reliability on the prediction result, and giving a priority to the vacant channel based on reliability.

First, the system for managing a channel set receives new information on the current channel by spectrum sensing, and if channel change is requested or it is determined that updating of the channel set is necessary, as the result of analyzing the input information, the system requests information of the vacant channels.

Candidate channels for channel change are selected, and current channel information on each of the candidate channels is input in operation S410.

It is determined from the input information whether or not each channel is empty in operation S420, and if the channel is being used, information on other channels is input in operation S410.

If the channel is empty, past channel information of the channel is input from the DB in operation S430. The DB retains channel information that is obtained by spectrum sensing and communication protocol with regard to respective time and channels.

Each module, such as the channel state predictor 231, the channel quality evaluator 233, the IU occurrence probability calculator 237, and the vacancy holding time evaluator 235, etc. receives each necessary information from the DB and predicts the channel quality and the channel state, respectively, in operations S440 through S480.

The channel state predictor 231 models occupation patterns of each channel and calculates a probability in which an IU of each channel appears in operation S440. The channel quality evaluator 233 evaluates the quality of the channel based on information (ex. SINR) on the quality of each channel in operation S450. The vacancy holding time estimator 235 estimates a vacancy holding time of each channel based on the vacancy holding time from time corresponding to an estimation time to the channel occupation starting time within each past time period in operation S460. The IU occurrence probability calculator 237 calculates a probability in which an IU of each channel appears, based on an IU occurrence frequency in operation S470. Calculation of each module may be performed independently without a predetermined order.

Reliability on each value that is calculated by each module is evaluated in operation S480.

A weighted value is given to each calculated value according to reliability to calculate a channel score, and the priority of each channel is determined according to the channel score in operation S490. When a weighted value is given to each calculated value, importance of the calculated value of each module, what channel quality information or channel state information exists, and the cause for channel change etc. may be additionally considered according to system environment and conditions.

As an example of weighted value usage, as shown in equation 2, when the reliability of the channel state predictor 231 is low, a high weighted value may be given to the value that is calculated by the IU occurrence probability calculator 237, and a low weighted value may be given to the value that is calculated by the channel state predictor 231.

$$\text{Channel score} = W1a * \text{channel prediction} + W1b * \text{IU occurrence Prob.} + W2 * \text{channel quality} + W3 * \text{holding time (where } W1a < W1b) \quad (2)$$

As another example of weighted value usage, as shown in equation 3, when the reliability of the channel state predictor 231 is low, a weighted value may be given to only the value that is calculated by the IU occurrence probability calculator 237 instead of the calculation value of the channel state predictor 231, and as shown in equation 4, when the reliability of the channel state predictor 231 is high, a weighted value may be given to only the value that is calculated by the channel state predictor 231 without using the calculation value obtained by the IU occurrence probability calculator 237.

$$\text{Channel score} = W1 * \text{holding time} + W2 * \text{channel quality} + W3 * \text{IU occurrence Prob.} \quad (3)$$

$$\text{Channel score} = W1 * \text{channel prediction} + W2 * \text{channel quality} + W3 * \text{holding time} \quad (4)$$

The present invention may be used in a communication system for dynamically allocating channels.

For example, it is assumed that there are totally 15 channels from 1 to 15 with a band width of 6 MHz and a communication system for dynamically allocating channels is being used by occupying channel 9. While the communication system checks a channel quality continuously, the result of analysis that the channel quality has suddenly becomes deficient is obtained. In this case, the operation of the channel set manager 270 is necessary. The communication system needs the list of channels for channel change. In this regard, the channels for channel change must have a good channel quality in which an IU does not appear frequently.

Thus, the channel set manager searches channels 1, 2, 3, 7, 11, 12, and 13 that are currently empty and checks a past recording of the 7 channels. Estimation of the channel quality and on how long a channel is empty, or on whether or not a next state is likely to be an empty state is performed based on the past recording. Information is provided to a portion managing communication protocol by giving a priority on the 7 channels based on the result of estimation such that the communication system moves to channel 11 having the highest priority.

In addition, even when the channel quality suddenly becomes deficient and the IU appears at a channel occupied by a user's communication system, the above-described method is used such that the list of channels for channel change can be provided.

Figure 5:
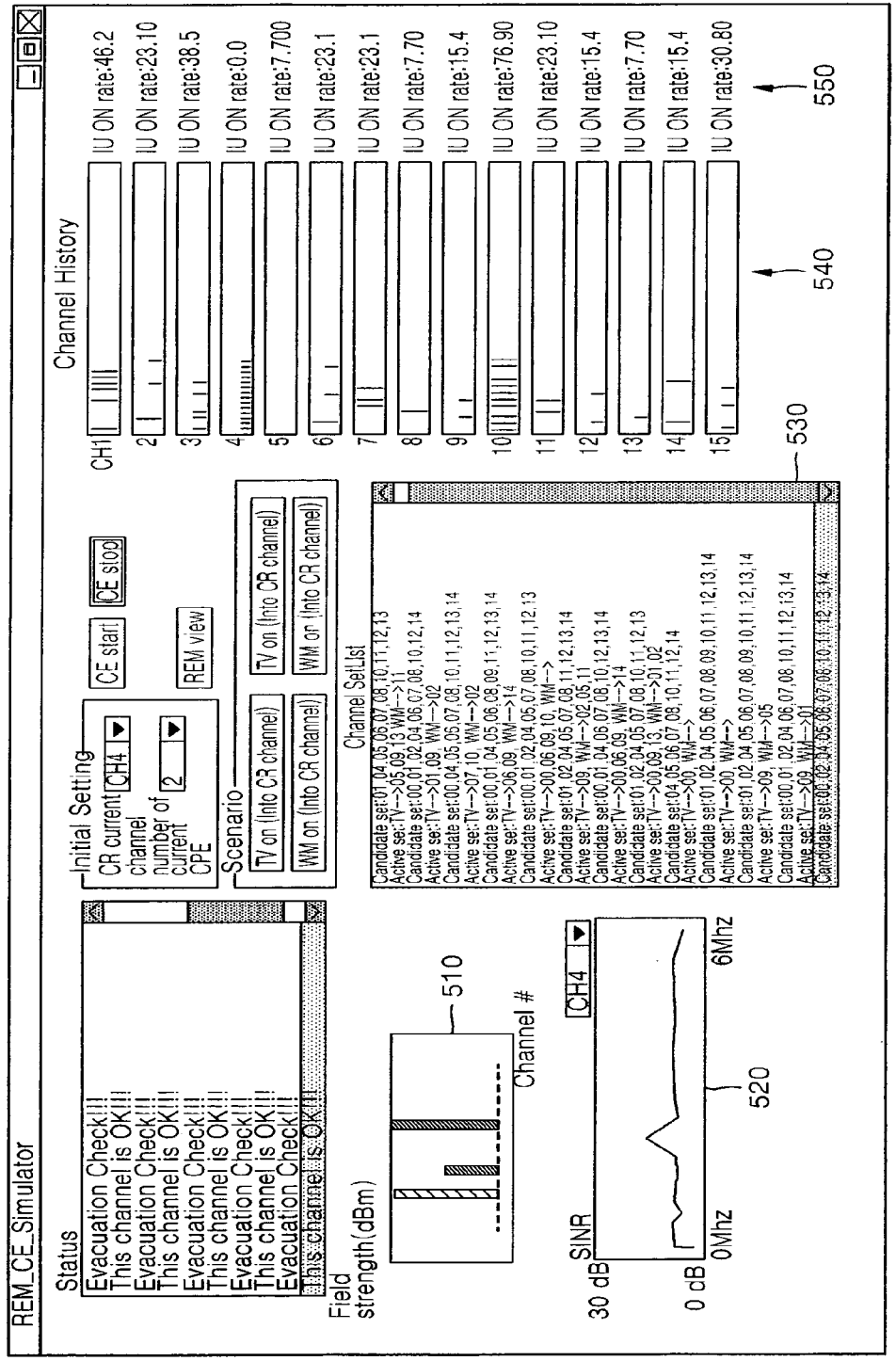
FIG. 5 illustrates a simulator implemented according to an embodiment of the present invention.

FIG. 5 illustrates a simulator implemented according to an embodiment of the present invention. Referring to FIG. 5, block 510 denotes a screen on which the result of sensing regarding 15 channels is displayed, wherein a green bar indicates the state of channel occupation of a user who wants to use a channel and a red bar indicates the state of channel occupation of a licensed user. A large bar indicates a TV, and a small bar indicates a wireless microphone. Block 520 denotes a screen on which the quality of a corresponding channel is displayed, and block 540 denotes a screen on which the history of the channel is displayed, wherein the screen is updated and is continuously stored whenever sensing is performed. Block 550 provides an IU occurrence probability that is calculated based on the stored recording. In addition, although not shown, channel state prediction and channel quality evaluation are performed internally. Through all of the procedures, a channel set list can be made as block 530, and the channel set list is transmitted to a portion taking charge in communication protocol and is used to determine a certain channel for the user.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, necessary information for determining an appropriate frequency to be moved for a system which dynamically changes frequencies is obtained by spectrum sensing and the result of communication protocol and is provided such that a corresponding system can select an optimum moving channel.

In addition, according to the present invention, a channel state and quality are predicted, and a weighted value is given to the predicted channel state and quality according to the reliability of the prediction value to determine the priority of an available channel, thereby allocating channels such that more reliable channel selection is possible.

In addition, according to the present invention, a CR communication system for dynamically allocating frequencies or channels manages vacant channels regularly so as to set an appropriate priority to usage of the vacant channels such that a channel set can be managed efficiently.

The present invention can be used as a core element in all of the fields requiring channel or frequency change.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A system for managing a channel set for dynamic channel allocation, the system comprising:
 a channel predictor predicting a channel state and a channel quality of a vacant channel based on channel information that is obtained by spectrum sensing and communication protocol, the channel predictor including
  a channel state predictor that models an occupation pattern of the vacant channel to calculate a probability that an incumbent user (IU) licensed to use the vacant channel appears on the vacant channel, and
  a vacancy holding time estimator estimating a vacancy holding time based on a statistic value of a duration from a specific time to a channel occupation starting time within each past time period of the vacant channel;
 a reliability determining unit evaluating reliability on the prediction result; and
 a channel set manager giving a priority to the vacant channel based on the evaluated reliability.

2. The system of claim 1, wherein the channel predictor comprises:
 a channel quality evaluator evaluating the quality of the vacant channel.

3. The system of claim 2, wherein the channel predictor further comprises an IU occurrence probability calculator calculating the probability that the IU appears, based on an IU occurrence frequency of the vacant channel.

4. The system of claim 3, wherein the channel set manager uses the prediction result of the IU occurrence probability calculator instead of the prediction result of the channel state predictor, if reliability of the prediction result of the channel state predictor is low.

5. The system of claim 2, wherein the vacancy holding time estimator estimates the vacancy holding time by giving a high weighted value to the time period that is closer to a current time.

6. The system of claim 1, wherein the channel set manager updates the channel set if a channel having the highest priority is allocated to a user who wants to move the channel.

7. The system of claim 1, wherein the channel set manager calculates a score on the vacant channel by giving a weighted value based on the reliability and gives a priority based on the calculated score.

8. The system of claim 1, wherein the channel set manager calculates a score on the vacant channel by giving a relatively high weighted value to the prediction result of a channel quality or a channel state according to a cause for channel change and gives a priority based on the calculated score.

9. The system of claim 1, further comprising a storage unit storing channel information that is obtained by spectrum sensing or communication protocol according to time and channels.

10. A method for managing a channel set for dynamic channel allocation, the method comprising:
 predicting, using a computing device, a channel state and a channel quality of a vacant channel based on channel information that is obtained by spectrum sensing using a sensor and communication protocol, the predicting including
  modeling an occupation pattern of the vacant channel to calculate a probability that an incumbent user (IU) licensed to use the vacant channel appears on the vacant channel, and
  estimating a vacancy holding time based on a statistic value of a duration from a specific time to a channel occupation starting time within each past time period of the vacant channel;
 evaluating, using the computing device, reliability on the prediction result; and
 giving, using the computing device, a priority to the vacant channel based on the evaluated reliability.

11. The method of claim 10, wherein the predicting of the channel state and the channel quality comprises:
 evaluating the quality of the vacant channel.

12. The method of claim 11, wherein the predicting of the channel state and the channel quality further comprises calculating a probability that the IU appears, based on an IU occurrence frequency of the vacant channel.

13. The method of claim 12, wherein, if reliability on the IU occurrence probability by the modeling of the occupation patterns is low, the IU occurrence probability calculated based on an IU occurrence frequency is used in the giving of the priority.

14. The method of claim 11, wherein the estimating of the vacancy holding time comprises estimating the vacancy holding time by giving a high weighted value to the time period that is closer to a current time.

15. The method of claim 10, further comprising updating a channel set if a channel having the highest priority is allocated to a user who wants to move the channel.

16. The method of claim 10, wherein the giving of the priority comprises calculating a score on the vacant channel by giving a weighted value based on the reliability and giving a priority based on the calculated score.

17. The method of claim 10, wherein the giving of the priority comprises calculating a score on the vacant channel by giving a relatively high weighted value to the prediction result of a channel quality or a channel state according to a cause for channel change and giving a priority based on the calculated score.

* * * * *